(No Model.)
F. P. H. PROX.
VALVE.
No. 262,829. Patented Aug. 15, 1882.
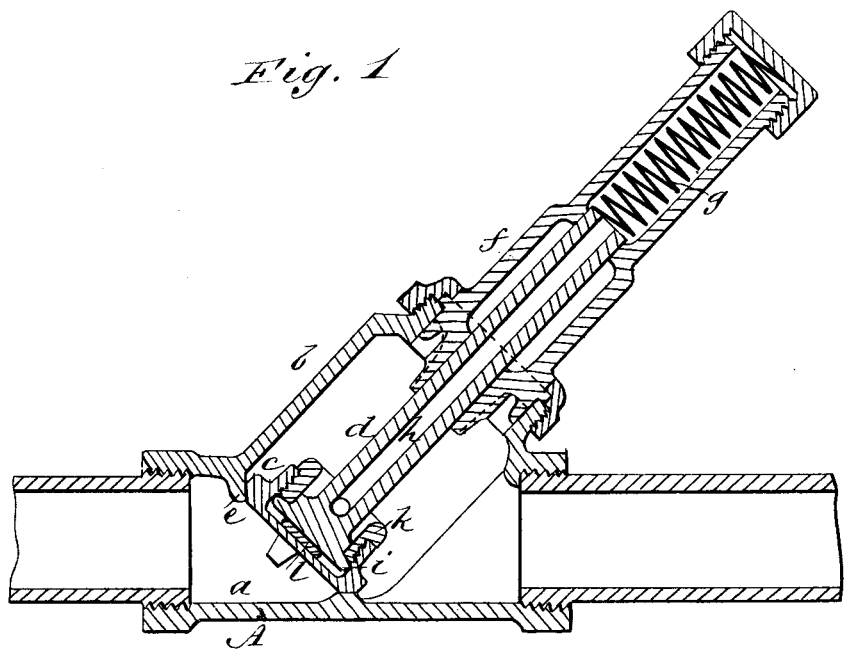
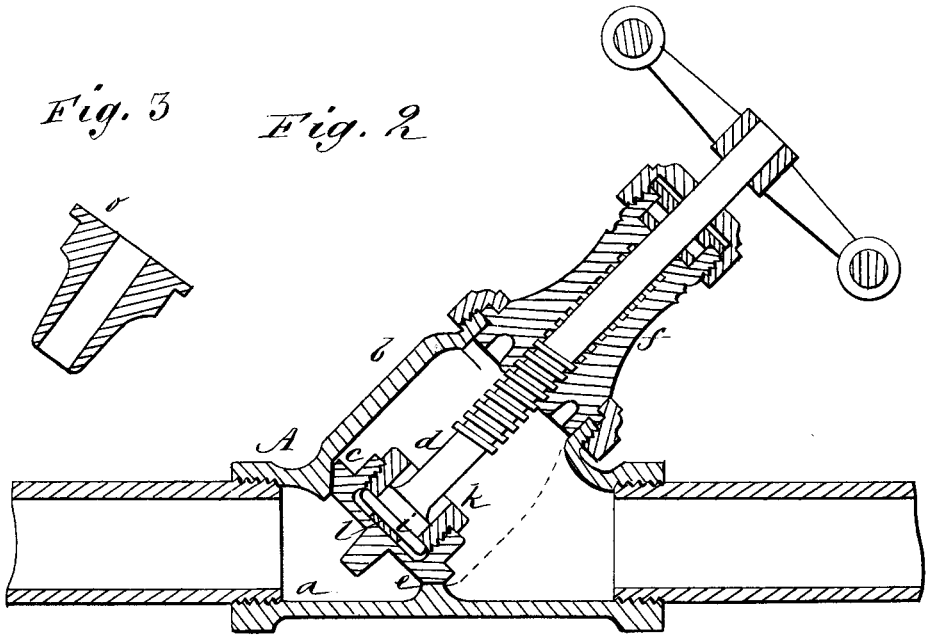
WITNESSES:
C. Neveux
C. Sedgwick
INVENTOR:
F. P. H. Prox
BY Munn &Co
ATTORNEYS.

UNITED STATES PATENT OFFICE.

FRANK P. H. PROX, OF TERRE HAUTE, INDIANA.

VALVE.

SPECIFICATION forming part of Letters Patent No. 262,829, dated August 15, 1882.

Application filed April 29, 1882. (No model.)

*To all whom it may concern:*

Be it known that I, FRANK P. H. PROX, of Terre Haute, Vigo county, Indiana, have invented a new and useful Improvement in Valves, of which the following is a full, clear, and exact description.

My invention relates to certain improvements in check and globe valves; and it consists in the peculiar construction, arrangement, and combination of parts hereinafter fully set forth.

Reference is to be had to the accompanying drawings, forming part of this specification, in which similar letters of reference indicate corresponding parts.

Figure 1 is a sectional elevation of a check-valve embodying my invention, and Fig. 2 is a sectional elevation of a globe-valve with my improvement. Fig. 3 is the guide used in regrinding the valve.

A is the body of the valve, consisting of the channel portion $a$ and of the neck $b$, that is formed at an angle of about forty-five degrees with the channel or tube $a$.

$c$ is the valve-plug, fitted upon the lower end of the stem $d$ in such a manner that it may turn thereon freely, so that the valve may be ground to its seat in the usual manner.

$e$ is the valve-seat, formed at the inside of the tube $a$ at an angle to correspond with the inclination of the valve.

In Fig. 1, which represents the check-valve, the stem $d$ extends into the hollow cap $f$, which contains a spring, $g$, acting to force the stem endwise and the valve to its seat. To prevent a vacuum at the upper end of the stem, it is formed with a longitudinal aperture, $h$, which opens at the side of the stem into the outlet portion of the valve-chamber, so that the fluid may pass to and from the space at the upper end of the stem, and thereby prevent any retardation in the movement of the valve by vacuum action.

In Fig. 2 the valve-stem is screw-threaded to engage a similar thread formed in the cap, and the stem is provided with a hand-wheel at its outer end, whereby the valve may be moved to and from its seat in the usual manner. In either case, when the valve is opened a straight unobstructed passage is provided for the fluid, so that the friction is reduced to a minimum and the flow is not interrupted by turns and bends. In the case of the check-valve any retrograde motion of the fluid will act immediately to return the valve to its seat, and this effect is further insured by the spring at the upper part acting on the stem and by the gravity of the valve.

To secure the plug to the end of the stem so that it may revolve freely, the stem is formed with an angular flange, $i$, that is retained in the recess formed in the back of the plug by a screw-ring, $k$.

Between the end of stem $d$ and the interior surface of the plug is a disk, $l$, upon which the end of the stem can be tightened or clamped by turning the screw-ring $k$ so as to connect the plug firmly to the end of the stem and prevent its rotation when it is desired to regrind the valve to its seat.

In regrinding the valve, cap $f$ will be removed and the guide $o$, Fig. 3, inserted, as shown in dotted lines in Fig. 1, for holding the stem in place.

Having thus described my invention, I claim as new and desire to secure by Letters Patent—

In a globe or check valve, the combination of the straight tube or channel-way $a$, formed with valve-seat $e$ and neck $b$, with the cap $f$, stem $d$, provided with flange $i$, screw-ring $k$, disk $l$, and valve-plug $c$, all constructed, arranged, and operating substantially as shown and described.

FRANK P. H. PROX.

Witnesses:
I. A. VRYDAGH,
N. NUHNAN.